United States Patent
Dong et al.

(10) Patent No.: US 7,853,214 B2
(45) Date of Patent: Dec. 14, 2010

(54) DYNAMIC MULTI-PATH DETECTION DEVICE AND METHOD

(75) Inventors: Ping Dong, Cupertino, CA (US); Jordan Christopher Cookman, San Jose, CA (US)

(73) Assignee: Microtune (Texas), L.P., Plano, TX (US)

( * ) Notice: Subject to any disclaimer, the term of this patent is extended or adjusted under 35 U.S.C. 154(b) by 908 days.

(21) Appl. No.: 11/650,226

(22) Filed: Jan. 5, 2007

(65) Prior Publication Data

US 2009/0017763 A1 Jan. 15, 2009

(51) Int. Cl.
*H04B 1/00* (2006.01)
*H04B 15/00* (2006.01)
*H04B 1/10* (2006.01)

(52) U.S. Cl. ............... 455/65; 456/226.1; 456/296; 456/303

(58) Field of Classification Search ........... 455/65, 455/226.1, 296, 303, 304, 305, 306
See application file for complete search history.

(56) References Cited

U.S. PATENT DOCUMENTS

| | | | | |
|---|---|---|---|---|
| 6,035,034 | A * | 3/2000 | Trump | 379/406.06 |
| 6,240,133 | B1 | 5/2001 | Sommer et al. | |
| 6,249,757 | B1 * | 6/2001 | Cason | 704/214 |
| 6,490,007 | B1 | 12/2002 | Bouillet et al. | |
| 7,032,138 | B2 | 4/2006 | Cameron | |
| 7,038,731 | B2 | 5/2006 | Tsuie | |
| 7,096,403 | B2 | 8/2006 | Seki | |
| 7,181,184 | B1 * | 2/2007 | Dimeo et al. | 455/296 |
| 7,343,143 | B2 | 3/2008 | Gamou | |
| 2001/0039637 | A1 | 11/2001 | Bengough | |
| 2004/0196933 | A1 * | 10/2004 | Shan et al. | 375/346 |
| 2006/0268962 | A1 * | 11/2006 | Cairns et al. | 375/148 |
| 2008/0075215 | A1 | 3/2008 | Dong et al. | |

OTHER PUBLICATIONS

Xiongwen Zhao, 'Multipath propagation characterization for terrestrial mobile and fixed microwave communications', Thesis for the degree of Doctor of Science in Technology, Helsinki University of Technology Radio Laboratory publications, Oct. 2002.
International Search Report and the Written Opinion issued for PCT/US2009/060144, dated Dec. 10, 2009, 9 pages.

* cited by examiner

*Primary Examiner*—Tuan H Nguyen
(74) *Attorney, Agent, or Firm*—Fulbright & Jaworski L.L.P.

(57) ABSTRACT

In one embodiment of the present invention, a dynamic multi-path detection device is disclosed to include at least one narrow-band signal metric estimator responsive to input signal. Each of the at least one estimators measures a particular characteristic of the input signal in a frequency band that is narrower than the overall signal bandwidth and is operative to generate a signal parameter estimate signal. The dynamic multi-path detection device is further disclosed to include a signal metric comparison device responsive to the signal parameter estimate signal(s) and operative to generate a dynamic multi-path indication signal for detecting dynamic multi-path.

11 Claims, 5 Drawing Sheets

DYNAMIC MULTI-PATH DETECTION DEVICE AND METHOD

BACKGROUND OF THE INVENTION

1. Field of the Invention

The present invention relates generally to receivers and particularly to receivers having capability to detect dynamic multi-path effects.

2. Description of the Prior Art

In a communication system, information is sent from a transmitter to a receiver over a channel, which introduces various impairments. One type of impairment that is commonly encountered in wireless communications is called multi-path. It is so-called because multiple copies, or "echoes", of the transmitted signal arrive at the receiver, taking multiple paths through the wireless medium. In analog television systems, such as NTSC in North America and PAL in Europe, multi-path impairments cause multiple images or "ghosts" in addition to the primary image. In wireless digital communication systems, including digital terrestrial television systems such as those defined by: 1) The known standard A/53 adopted by the Advanced Television Systems Committee (ATSC); 2) The known standard EN 300 744 adopted by the European Telecommunications Standards Institute (ETSI); or 3) The known standard for Digital Television Terrestrial Multimedia Broadcast (DTMB) adopted in China, it is generally necessary to mitigate multi-path in the receiver in order to decode the in-coming signal without errors.

As is well known in the art, multi-path impairments can be categorized as either "flat fading" or "frequency-selective fading." In general, flat fading refers to multi-path impairments that cause approximately equal attenuation at all frequencies in the signal band. This type of fading can be compensated by a simple multi-path mitigation device, such as an Automatic Gain Control (AGC.) Frequency-selective fading, on the other hand, attenuates some frequencies more than others. This necessitates the use of a more complex multi-path mitigation device such as an equalizer. Generally the receiver does not know in advance the exact attenuation of each frequency, so it must use an adaptive multi-path mitigation device such as an adaptive equalizer, which must be adapted so as to allow error-free recovery of data. Initial adaptation occurs at the beginning of the signal reception. Such adaptation may include programming initial coefficients, updating coefficients based on either blind or deterministic criteria, or other adaptive approaches. After initial equalizer adaptation is complete, the adaptation can be slowed or stopped, assuming the multi-path is static.

However, if the multi-path is dynamic, such as is the case when the receiver is moving, then the relative attenuation of different signal frequencies changes over time and needs to be tracked by a dynamic multi-path mitigation device, such as a continuously training adaptive equalizer.

As is well known in the art, one challenge in designing a dynamic multi-path mitigation device, such as a continuously training adaptive equalizer, is choosing the appropriate adaptation speed for the equalizer. However, typically, faster adaptation results in increased sensitivity to noise, thus, there is a tradeoff between noise performance and tracking speed. Various approaches have been considered in the art for automatically adjusting the adaptation speed of an adaptive equalizer. Many of these approaches rely on the error level after equalization, based for example on constellation distance measurements or bit error corrections performed by a forward error correction (FEC) module like a Reed-Solomon decoder. For example, in one prior art technique, successive values of mean square error (MSE) are used to adjust the adaptation speed of an equalizer. Other prior art techniques adjust the adaptation speed of the equalizer in a direction to reduce packet error rate and do so within the Reed-Solomon decoder.

The problem with relying on error level for adjusting the adaptation speed is that it is difficult to ascertain the source of an increase in error level. That is, it is not known whether or not the source of the increased error level is due to dynamic multi-path, requiring a faster adaptation speed or due to random noise, requiring a slower adaptation speed. Problems associated with the inability to correctly identify the source of the experienced increase in error level obviously lead to various issues. For example, it may lead to erroneous adjustments and more importantly to failure to mitigate dynamic multi-path.

Some prior art techniques do not address the problem of detecting the source of the increased error level and others rely on a trial and error type approach. Yet another approach is to adjust the adaptation speed using the gradient of the equalizer coefficients. For example, in one prior art method, the equalizer step sizes are adjusted based on the gradient of the coefficients. However, the coefficient gradient is sensitive to random noise, thus, this approach can cause the adaptation speed to be unnecessarily and undesirably increased.

The use of multiple filters with different time constants for detection purposes is known in the art of signal processing but is not known to have been applied to dynamic multi-path detection. In a known prior art technique, in detecting voice activity, a fast filter and a slow filter are used to distinguish between real voice signals and noise signals and the filters are used to measure the power of the entire signal but they are not used to measure the signal metric in a frequency band less than the input signal bandwidth. The problem with using this approach for dynamic multi-path detection is that in many cases, dynamic multi-path causes significant change in the signal metric in a particular frequency band but the overall signal power remains the same. Therefore, the change in the signal metric would remain undetected and dynamic multi-path would not be mitigated.

With the shutoff of analog terrestrial television looming, the performance demands on digital television receivers are increasing. A particular area of interest is performance in dynamic multi-path environments where the digital television receiver is mobile. Additionally, there is a requirement that improved dynamic multi-path performance not occur at the expense of increased sensitivity to additive noise in static channels.

In light of the foregoing, there is a need for a method and apparatus for the detection of dynamic multi-path for use in configuring the adaptation speed of a dynamic multi-path mitigation device, such as a continuously training adaptive equalizer.

SUMMARY OF THE INVENTION

Briefly, in one embodiment of the present invention, a dynamic multi-path detection device includes at least one narrow-band signal metric estimator responsive to input signal. Each of the at least one estimators measures a particular characteristic of the input signal in a frequency band that is narrower than the overall signal bandwidth and is operative to generate a signal parameter estimate signal. The dynamic multi-path detection device is further disclosed to include a signal metric comparison device responsive to the signal parameter estimate signal(s) and operative to generate a dynamic multi-path indication signal for detecting dynamic multi-path.

The foregoing and other objects, features and advantages of the present invention will be apparent from the following detailed description of the preferred embodiments which make reference to several figures of the drawing.

DETAILED DESCRIPTION OF THE PREFERRED EMBODIMENTS

To overcome the limitations in the prior art described above, and to overcome other limitations that will become apparent upon reading and understanding the present specification, the present invention discloses an apparatus and method for detecting the rate of change of multi-path for causing the rate of adjusting an adaptive equalizer accordingly to effectively mitigate dynamic multi-path.

The present invention solves the above-described problem (s) by providing, in one embodiment of the present invention, a method and apparatus for detecting the rate of change of a selected characteristic (or parameter or metric) of an incoming signal in a manner consistent with the rate of change in multi-path (distortion) for use in mitigating dynamic multi-path to decrease error levels and increase system performance. It should be noted that the terms "multi-path", "multi-path distortion", and "multi-path impairment(s)" are used interchangeably so that any references herein to "multi-path" are intended to refer to multi-path distortion or multi-path effects.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of embodiments of the present invention.

Figure 1:
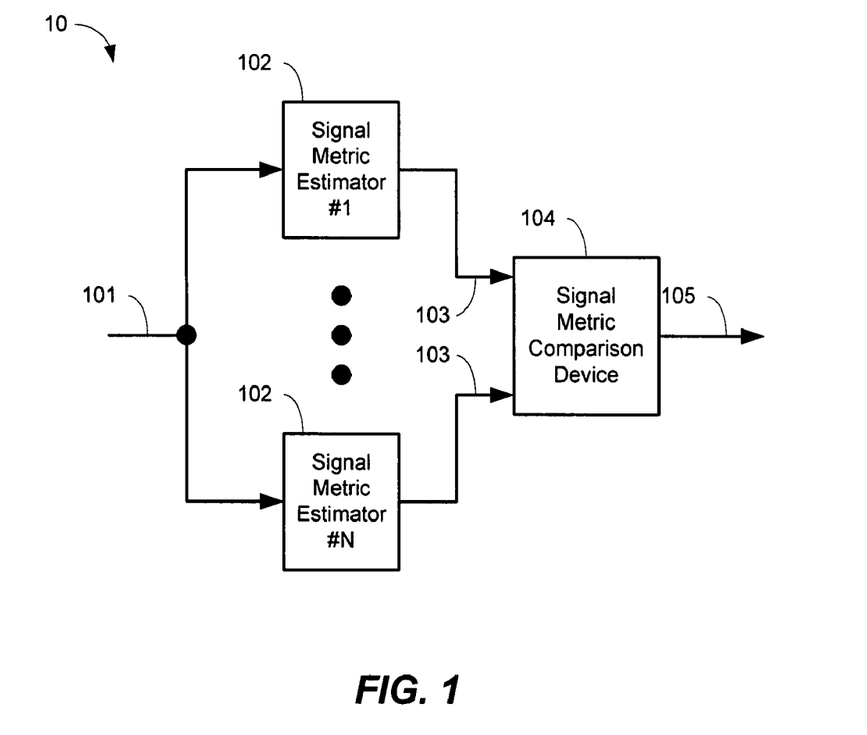
FIG. 1 shows a dynamic multi-path detection device to include an N number of narrow-band signal metric estimators, and a signal metric comparison device, in accordance with an embodiment of the present invention.

Referring now to FIG. 1, a dynamic multi-path detection device 10 is shown to include an N number of narrow-band signal metric estimators 102, N being an integer, each narrow-band signal parameter (or metric or characteristic) estimators 102 is shown coupled to a signal metric comparison device 104, which is shown to generate a dynamic multi-path indication signal 105, in accordance with an embodiment of the present invention. The estimators 102 each generate a signal parameter estimate signal 103, which are received by the device 104.

"Narrow-band" refers to a bandwidth that is less than the overall signal bandwidth. While the signal metric comparison device 104 is shown to receive input from the estimators 102, in other embodiments, it can receive input from other sources, including but not limited to "wide-band" or "signal-band" signal metric estimators.

The device 10 receives a signal input 101 and in one embodiment of the present invention is a part of a receiver system that receives input from an antenna, with the signal 101 being generated by, for example, a carrier recovery circuit. An exemplary application of the device 10 is digital television, which will be discussed in further detail below. The estimators 102 are each estimators of a characteristic or parameter associated with the signal, such as but not limited to, absolute signal level, signal power, or other signal statistics. Such a signal characteristic is reflected in the signal 103.

While in FIG. 1, N number of estimators 102 is shown, any number of estimators may be employed. In fact, additional estimators may result in improved dynamic multi-path detection by providing finer detection capability across the frequency spectrum.

In one embodiment of the present invention, particularly where the parameter being measured is a direct current (DC) level, each of the estimators 102 is a low pass filter (LPF) with each filter having a unique bandwidth and a varying range than another. For example one of the estimators 102 has a narrower bandwidth than the remaining N-1 estimators and another has a bandwidth greater than the former yet less than the remaining N-1 estimators and so on. The different range of bandwidths allow for the outputs of different estimators 102 to change at different rates. The different and unique bandwidths associated with the estimators 102 cause detection of the rate of change in multi-path of the signal 101. Thus, in the case where each estimator is estimating the DC level, for a given rate of change in multi-path of the signal 101, the rate of change in the DC level of each of the estimators 102 is different due to the different bandwidth, and the rate of change in multi-path of the signal 101 can be detected by comparing (subtracting) the outputs of the different estimators 102.

Each of the estimators 102 estimates a signal parameter or metric surrounding a predetermined signal frequency, wherein the bandwidth of each of the estimators 102 (or the estimation bandwidth) is less than the overall signal bandwidth, i.e. the bandwidth of the signal 101. For this reason, the estimators 102 are referred to as "narrow-band". In one embodiment, the estimators 102 each have a unique bandwidth and in another embodiment, the estimators 102 all have the same bandwidth but different center frequencies. In yet another embodiment, the estimators 102 all have the same bandwidth and center frequency, but each measures a different signal parameter or metric. Other embodiments are contemplated, wherein the estimators 102 use various combinations of bandwidth, center frequency, and signal parameter or metric.

More specifically, the signal metric comparison device 104 receives the signal metric estimate signals 103 from the estimators 102, and is responsive to changes in the signal metric estimates that occur over time. In an alternative embodiment of the present invention, the signal metric comparison device 104 may receive input from other than the estimators 102, such as from sources like wide-band or signal-band signal metric estimators, wherein the estimation bandwidth is greater than or equal to the bandwidth of the input signal 101, in addition to receiving input from one or more estimators 102.The signal metric comparison device 104 generates the dynamic multi-path indication signal 105, which is indicative of the presence of dynamic multi-path impairments in the signal. The dynamic multi-path indication signal 105 may be a Boolean (true or false) signal indicating either the presence or absence of dynamic multi-path impairments in the signal, or it may be a multi-level digital or analog signal whose magnitude is proportional to the severity of the multi-path impairments in the signal, or it may be some other indication related to multi-path impairments. While not shown in FIG. 1, as an example, the dynamic multi-path indication signal 105 may be used by a dynamic multi-path mitigation device (or other device) in a receiver to control a parameter, such as adaptation or tracking speed of an adaptive equalizer.

Figure 2:
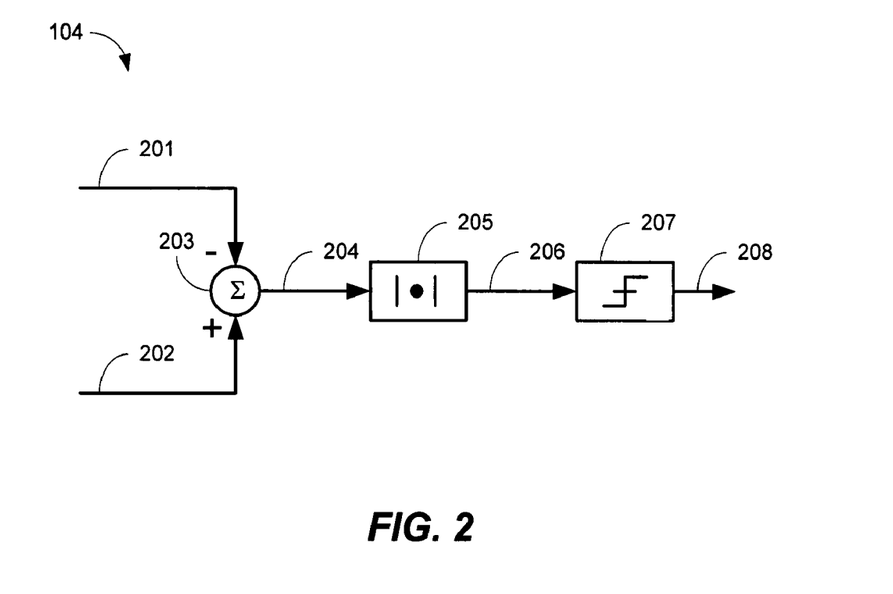
FIG. 2 shows further details of the signal metric comparison device of FIG. 1, in accordance with an embodiment of the present invention.

FIG. 2 shows further details of the signal metric comparison device 104 of FIG. 1, in accordance with an embodiment of the present invention. The embodiment of FIG. 2 is particularly useful in the presence of two narrow-band signal metric estimators 102, each configured to measure a signal metric or parameter surrounding the same frequency and differing only in their bandwidths that are used for estimation. In an exemplary embodiment, the two narrow-band signal metric estimators 102 use filters with different time constants.

In FIG. 2, a summing device 203 is shown to receive two metric estimate input signals 201 and 202, and is further shown to generate a metric difference signal 204. An absolute value device 205 receives the metric difference signal 204, and generates an absolute signal metric difference signal 206. A threshold comparison device 207 receives the absolute signal metric difference signal 206 and generates a dynamic multi-path indication signal 208.

In operation, the device 203 adds (or subtracts) the signals 201 and 202 to generate the signal 204. The absolute value of the signal 204 is calculated by the signal 205 to generate the signal 206, which is used by the device 207 to determine the polarity of the signal 206 relative to a predetermined threshold. That is, in one embodiment of the present invention, the signal 208 is logically at a 'true' state when the signal 206 is determined to be above a predetermined threshold and at a 'false' state when the signal 206 is considered to be below the predetermined threshold. The 'true' vs. 'false' state of the signal 208, which is the same as the signal 105, is indicative of a first or second rate of change of multi-path, respectively. Thus, in the embodiment of FIG. 2, the detection of dynamic multi-path is limited to detecting two rates, which while contributing to the following issues does cause fast dynamic multi-path detection.

Two known issues in a dynamic multi-path detection device are false detection and detection speed. False detection can occur, for example, if the narrow-band signal metric estimators 102 (of FIG. 1) are too sensitive to noise or if the threshold used in the threshold comparison device 207, in FIG. 2, is too small. One approach for reducing false detection probability is to add a time requirement, for example requiring the absolute signal metric difference signal 206 to be above a threshold for a certain amount of time before asserting the dynamic multi-path indication signal 207. This reduces false detection probability, but also reduces detection speed.

Figure 3:
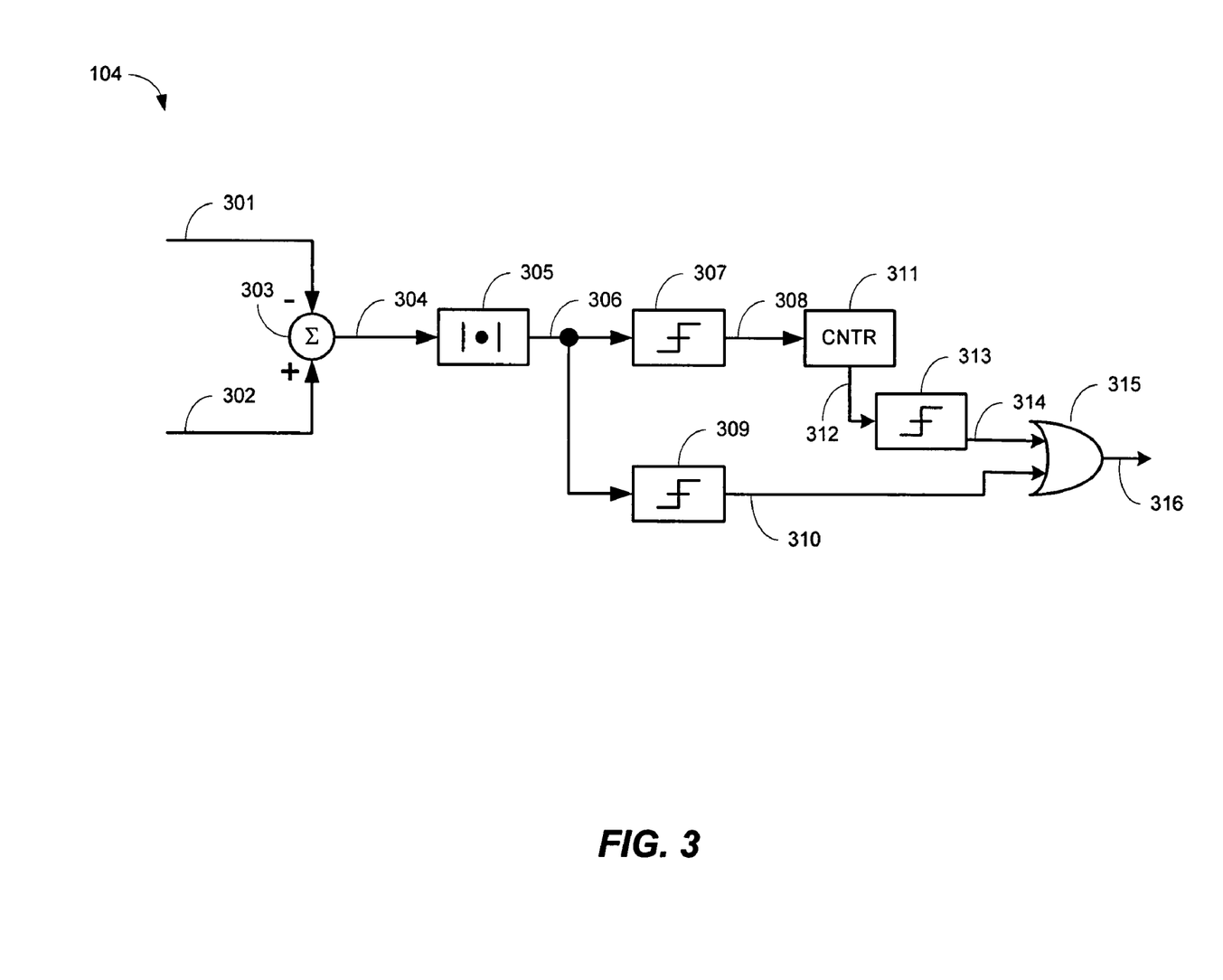
FIG. 3 shows further details of the signal metric comparison device of FIG. 1, in accordance with another embodiment of the present invention.

FIG. 3 shows further details of the signal metric comparison device 104 of FIG. 1, in accordance with another embodiment of the present invention. In FIG. 3, the signal metric comparison device 104 is shown to include a summing device 303, an absolute value device 305, a first threshold comparison device 307, a second threshold comparison device 309, a time measurement device 311, a third threshold comparison signal 314, and a logic device 315. The device is shown to generate a dynamic multi-path indication signal 316.

The device 303 is shown to receive a first metric estimate input signals 301 and a second metric estimate input signal 302, which are provided by the signals 103 in FIG. 1. The device 303 adds (or subtracts) the signals 301 and 302 and generates a metric difference signal 304, which serves as input to the device 305. The device 305 performs an absolute value operation on the signal 304 to generate the absolute metric difference signal 306, which is provided as input to the devices 307 and 309. The device 307 compares the signal 306 to a first threshold value and provides the outcome of the comparison onto the first threshold comparison signal 308 to the device 311. The device 309 compares the signal 306 to a second threshold value and provides the outcome of the comparison onto the second threshold comparison signal 310 to the device 315. The device 311 uses the signal 308 to count time during which a change in multi-path is detected. In this manner, a false change in multi-path is avoided because, as will be apparent shortly, the change in multi-path is further detected after a predetermined period of time. That is, the device 311 provides the threshold comparison time signal 312 to the device 313, which compares the signal 312 to a third threshold value and provides the outcome of its comparison to the device 315. In this manner, because some time is awaited and then another threshold comparison is performed before declaring the presence (or not) of multi-path changes, the declared change is unlikely to be a false declaration because the change in multi-path has been detected to exist for some time, whereas, the change would not remain with time if it was not valid.

The embodiment of FIG. 3 is particularly useful in the presence of two of more narrow-band signal metric estimators, such as the estimators 102, which can each be configured to measure a signal metric around the same frequency, with each estimator differing only in the bandwidth used for estimation.

It should be noted that while two threshold comparison devices, such as the devices 307 and 309 are shown, other number of such devices may be employed. Additional threshold comparison devices may result in faster equalizer adaptation time as well as improved tracking of dynamic multi-path distortion.

In operation, the device 303 receives the signals 301 and 302, and generates the signal 304. The device 305 receives the signal 304, and generates the signal 306. The device 307 receives the signal 306, and generates the signal 308. The signal 308, in one embodiment of the present invention, is at a logical 'true' state when the signal 306 exceeds a first threshold. The device 309 receives the signal 306, and generates the signal 310. The signal 310, in one embodiment of the present invention, is at a logical 'true' when the signal 306 exceeds a second threshold, which is larger than the first threshold. The use of the two threshold comparison devices 307 and 309, the device 311 and the third threshold comparison device 313 allows for quick detection of a fast-changing multi-path while in the presence of a slow-changing multi-path, the change is not falsely detected. In this respect, an adaptive equalizer coupled to the device 10 of FIG. 1 is caused to be triggered to adapt fast in the presence of a fast-changing multi-path yet move to slower adaptation in the presence of a slower changing multi-path thereby reducing error levels and increasing system performance.

The device 311 is shown to receive the signal 308, and measures the amount of time the signal 308 is, for example, at a logical 'true' state, generating the signal 312. The device 311 may, in an exemplary embodiment, be implemented using a counter that increments at a fixed rate whenever the signal 308 is at a logical 'true' state, and resets, for example to the value "0" whenever the signal 308 is at a logical 'false' state, or after some predetermined time.

In an exemplary embodiment of the present invention, the counter 311 is reset to '0' after some predetermined time, so that the counter 311 acts like a measurement window and the percent of time that the state is 'true' within that measurement window is determined, rather than a continuous 'true' state.

The device 313 compares the threshold comparison time, reflected in the signal 312, to a third threshold to generate the signal 314. The device 315 receives the signal 310 and the signal 314 and generates the signal 316. In an exemplary embodiment, the signal 316 is caused, by the device 315, to be at a logical 'true' state whenever either the signal 310 is at a logical 'true' state or the signal 314 is at a logical 'true' state indicating a change in multi-path whenever both signals 314 and 310 are at a 'false' state, the signal 316 is caused to be, by the device 315, at a 'false' state indicating that there is no change in multi-path. While logical states of various types have been discussed relative to figures herein, it should be noted that other types of states associated with the signals discussed herein are contemplated and the states discussed herein are merely used as examples.

As previously noted, one of the applications of the embodiment of FIG. 1 is digital terrestrial television. In digital terrestrial television applications, the digital terrestrial television signals are broadcast according to the A/53 standard adopted by the Advanced Television Systems Committee (ATSC.) In the A/53 system, the digital television signal includes a pilot signal located at a predetermined frequency, i.e. 310 kHz from the band edge. In a typical receiver, the pilot signal is moved to DC by a carrier demodulation device. Due to the presence of the pilot signal, the signal level near DC after carrier demodulation is a useful signal metric, parameter or characteristic. Also, dynamic multi-path detection can be accomplished by comparing short-term and long-term DC averages. Therefore, it is advantageous to implement the device 10 of FIG. 1 and all other embodiments thereof after the carrier demodulation device of an ATSC A/53 receiver. Referring again to FIG. 1, an exemplary application of the basic invention to an ATSC A/53 receiver will be described. It should be appreciated by those skilled in the art that other applications of the device 10 to an ATSC A/53 receiver are anticipated, including the use of more or less than two narrow-band signal metric estimators, such as the estimators 102 and the use of signal metrics other than DC level, and different criteria for signal metric comparison, without departing from the scope of the present invention.

In an exemplary digital terrestrial television application using the embodiment of FIG. 1, there are two signal metric estimators 102 (N=2), each of which measures the signal level near DC. The two estimators 102 differ in the choice of time constant, one using a slower estimate and the other using a faster estimate. Each of the two estimators 102 generates a metric estimate signal 103, which is derived from an estimate of the average signal level. A signal metric comparison device 104 receives both of the signal metric estimates 103, and is responsive to changes in said signal metric estimates over time. Said signal metric comparison device 104 generates a dynamic multi-path indication signal 105, which is indicative of the presence of dynamic multi-path impairments in the signal. The digital terrestrial television application of the device 10 is now further discussed relative to FIG. 4.

Figure 4:
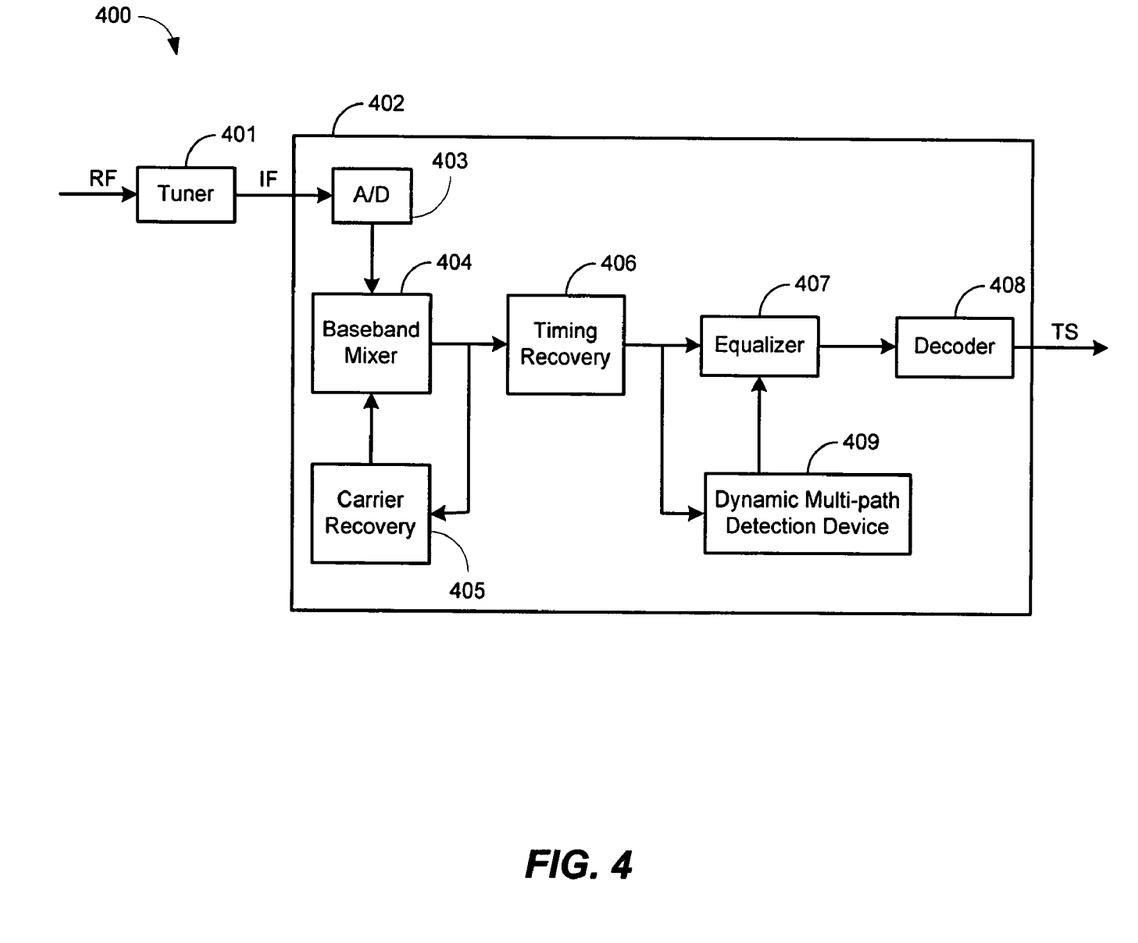
FIG. 4 shows a high-level block diagram of an example application of a dynamic multi-path detection device in a digital terrestrial television receiver, in accordance with an embodiment of the present invention.

Referring now to FIG. 4, in accordance with an embodiment of the present invention, a high-level block diagram of an example application of the device 10 is shown in a digital terrestrial television receiver 400. The receiver 400 is shown to include a dynamic multi-path detection device 409, which is similar to the device 10 of FIG. 1 and all other detection devices of the various embodiments of the present invention.

As an example, the receiver 400 is used to receive digital terrestrial television signals broadcast according to Advanced Television Systems Committee (ATSC) standard A/53.

Included within the receiver 400, there is shown a demodulator Integrated Circuit (IC) 402 coupled to a tuner 401, which receives a radio frequency (RF) input.

In accordance with one embodiment of the present invention, the IC 402 is shown to include an analog-to-digital (A/D) converter 403, a baseband mixer 404, a carrier recovery circuit 405, a timing recovery device 406, an adaptive equalizer 407, a decoder 408, and the dynamic multi-path detection device 409 according to this invention. The IC 402 is shown coupled to a tuner 401, which provides intermediate frequency (IF) signals to the IC 402 and receives as its input radio frequency (RF) signals from a communication channel. The A/D converter 403 is shown coupled to the mixer 404, which is shown coupled to the carrier recovery circuit 405. The mixer 404 and the carrier recovery circuit 405 are shown coupled to the timing recovery device 406, which is, in turn, shown coupled to the adaptive equalizer 407. The adaptive equalizer 407 is shown coupled to the decoder 408 and the latter provides an output Transport Stream (TS). The dynamic multi-path detection device 409 is shown coupled to both the timing recovery device 406 and the adaptive equalizer 407.

Still referring to FIG. 4, the tuner 401 is shown to receive a RF signal for down-conversion of the same to an Intermediate Frequency (IF) signal, which serves as input to the IC 402, and shown coupled to the A/D converter 403 of the IC 402. In other embodiments of the present invention, the IC 402 is not necessarily a chip, semiconductor or integrated circuit, as shown and discussed relative to FIG. 4. Rather, the IC 402 may include more than one IC or be a part of a system or implemented in software.

In operation, the IC 402 processes the IF signal to produce a digital video Transport Stream (TS). The A/D converter 403 samples the analog IF signal at a rate not synchronized to a remote transmitter (the latter not shown in FIG. 4), to produce a digital IF signal and provides the same to the baseband mixer 404. The baseband mixer 404 down-converts the digital IF signal to baseband and provides the down-converted baseband signal to the timing recovery device 406. The carrier recovery circuit 405 synchronizes the baseband mixer 404 to the IF carrier. The timing recovery device 406 re-samples the down-converted baseband signal at a rate synchronized to the remote transmitter, automatically updating its re-sampling rate to maintain synchronization. The adaptive equalizer 407 removes multi-path distortion and other forms of inter-symbol interference (ISI) from the signal. The decoder 408 performs trellis decoding, de-interleaving, forward error correction, de-randomizing, and other functions to produce the digital video TS.

The device 409 receives the output signal of the timing recovery device 406, and is responsive to dynamic multi-path distortion in the received signal, in a manner consistent with earlier discussions and figures herein. The device 409 provides a dynamic multi-path detection signal to the adaptive equalizer 407, causing the adaptive equalizer 407 to adjust its adaptation rate according to the rate of change of multi-path distortion in the signal. It will be understood that other receiver configurations may be used within the IC 402, including those wherein the A/D sampling rate is synchronized to the remote transmitter. It will also be understood that other processing blocks not illustrated in FIG. 4 may be included within the IC 402, such as but not limited to an Automatic Gain Control (AGC), digital filters, and various synchronization circuits. It will also be understood that the device 409 may receive, as its input, a signal other than the output of the timing recovery device 406, such as that generated by other circuits of the IC 402. An example of the foregoing is the output of the baseband mixer 404 such that the output of the baseband mixer 404 rather than the output of the timing recovery device 406 is provided as input to the device 409. It will also be understood that the embodiments of the present invention are applicable to other types of communication systems and other receiver configurations than that illustrated in FIG. 4.

Figure 5:
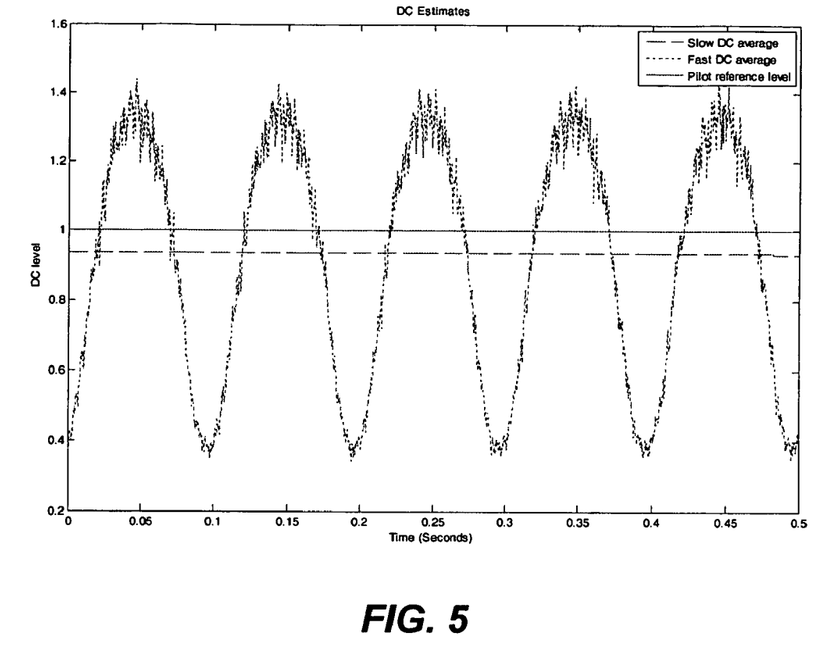
FIGS. 5-7 illustrate graphs of the behavior of dynamic multi-path detection signals in an example implementation for an ATSC A/53 receiver, such as the receiver 400 of FIG. 4.
Figure 6:
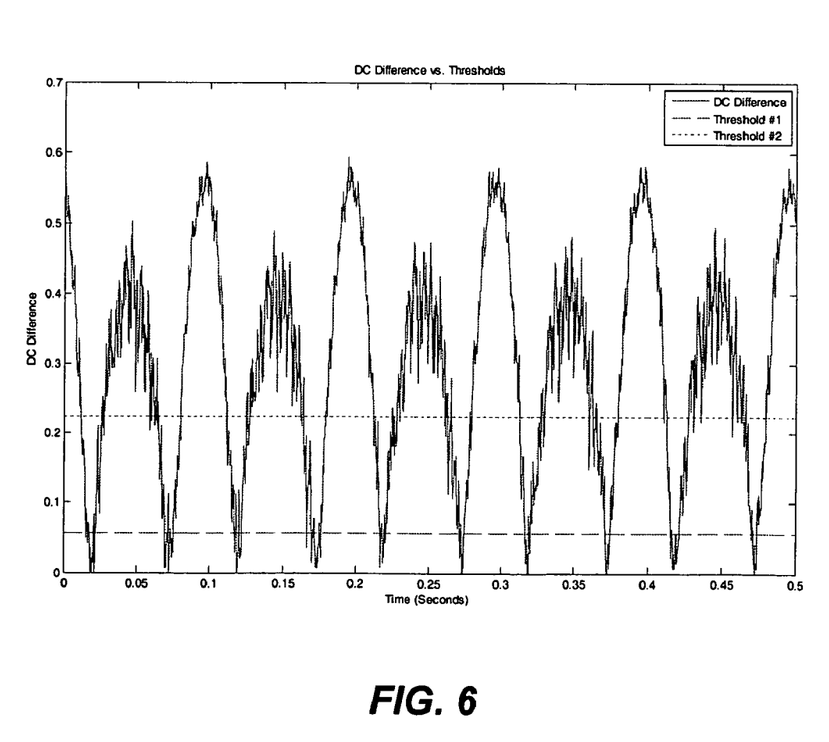
Figure 7:
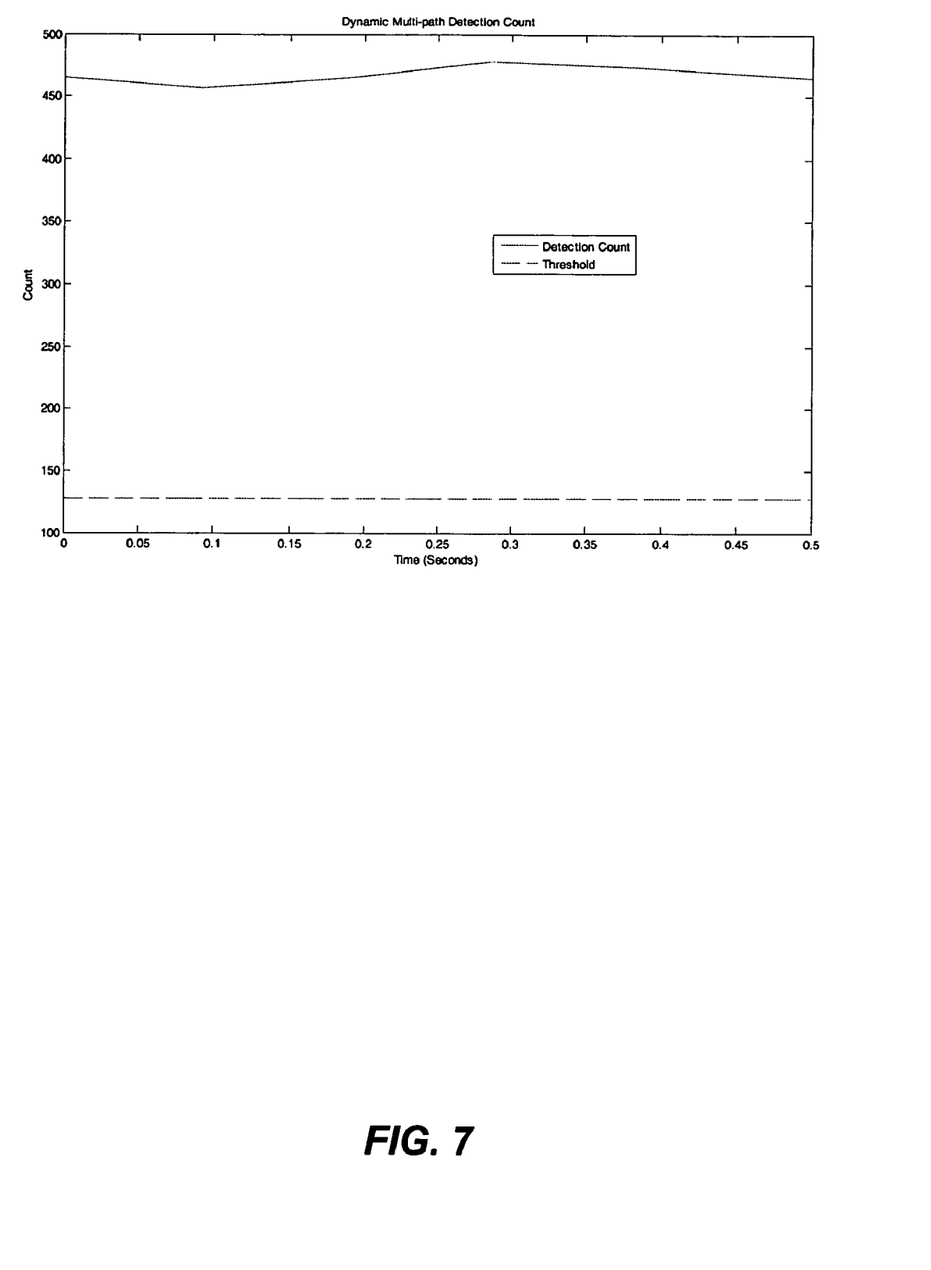

FIGS. 5, 6, and 7 illustrate graphs of the behavior of dynamic multi-path detection signals in an example implementation for an ATSC A/53 receiver, such as the receiver 400 of FIG. 4. In this example, a dynamic multi-path detector is used with two signal metric estimators. Both signal metric estimators estimate the DC level of the signal. Both signal metric estimators are comprised of a one-pole digital infinite impulse response (IIR) filter followed by an accumulate-and-dump circuit. Both IIR filters can be described by the following discrete time equations, where x(n) is the input signal at time index n, dc(n) is the estimated DC level of the signal at time index n, and y(n) is an output signal with components at or near DC removed, also at time index n:

$$y(n)=x(n)-dc(n-1) \quad \text{Eq. (1)}$$

$$dc(n)=y(n)/8192 \quad \text{Eq. (2)}$$

The filter operates at the ATSC A/53 symbol rate of approximately 10.76 million symbols/second. The accumulate-and-dump circuit calculates the average value of dc(n) over N symbols, where N=4096 ($2^{12}$) for one signal metric estimator (the "fast" estimator), and N=2,097,152 ($2^{21}$) for the other (the "slow" estimator.)

In this example, a signal metric comparison device according to the embodiment of FIG. 3 is used. FIG. 5 is a graph of the two DC estimates 301 and 302 over time for a simulated ATSC signal with simulated multi-path impairment consisting of a single echo with 5 microsecond delay, attenuated by 5 dB, with 10 Hz Doppler frequency offset, all relative to the main signal path. The x-axis of FIG. 5 is normalized such that the nominal A/53 pilot level is 1.0. FIG. 6 is a graph of the absolute DC difference signal 306 vs. the thresholds (approximately 0.056 and 0.224) used by the two threshold comparison devices 307 and 309. In this example, the time measurement device is a counter which increments every 4096 ($2^{12}$) symbols if the first DC estimate is above the first threshold. The counter is latched to the threshold comparison time 312 every 2,097,152 ($2^{21}$) symbols, then reset to 0. FIG. 7 is a plot of the threshold comparison time 312 and the threshold (128) used by the third threshold comparison device 313. In this embodiment of the invention, the output of the dynamic multi-path detection device is a Boolean logic signal, which is true when the multi-path is changing faster than a certain rate, determined by the three thresholds. For the simulated signal described above, the output is always true, because the threshold comparison time 312 is always above the threshold.

Although the present invention has been described in terms of specific embodiments it is anticipated that alterations and modifications thereof will no doubt become apparent to those skilled in the art. It is therefore intended that the following claims be interpreted as covering all such alterations and modification as fall within the true spirit and scope of the invention.

What is claimed is:

1. A dynamic multi-path detection device comprising:
   at least one narrow-band signal metric estimator responsive to an input signal with an input signal bandwidth, each of the at least one estimators measuring a particular characteristic of the input signal within a bandwidth less than the input signal bandwidth and operative to generate a parameter estimate signal; and
   a signal metric comparison device responsive to the parameter estimate signal(s) and operative to generate a dynamic multi-path indication signal for detecting dynamic multi-path, wherein the signal metric comparison device includes,
      a summing device for summing the parameter estimate signals and operative to generate a metric difference signal;
      an absolute value device responsive to said metric difference signal and operative to generate an absolute metric difference signal;
      a first threshold comparison device and a second threshold comparison device, both coupled to receive the absolute metric difference signal, the first threshold comparison device operative to generate first threshold comparison signal and the second threshold comparison device operative to generate a second threshold comparison signal, and the signal metric comparison device further includes a counter responsive to the second threshold comparison signal and operative to generate a threshold comparison time signal; and
      a third threshold comparison device coupled to receive the threshold comparison time signal and operative to generate a third threshold comparison signal.

2. A dynamic multi-path detection device, as recited in claim 1, wherein said dynamic multi-path indication signal is used to adapt multi-path tracking speed in accordance with multi-path changes thereby causing mitigation of dynamic multi-path and increasing system performance.

3. A dynamic multi-path detection device, as recited in claim 1, wherein the signal metric comparison device further includes a logic device responsive to the second threshold comparison signal and the third threshold comparison signal and operative to generate the dynamic multi-path indication signal.

4. A dynamic multi-path detection device, as recited in claim 1, wherein the dynamic multi-path detection device is responsive to changes in said signal metric estimates over time.

5. A dynamic multi-path detection device, as recited in claim 1, wherein the input signal is the output of a carrier recovery circuit.

6. A dynamic multi-path detection device comprising:
   estimator means for measuring a particular characteristic of a received input signal with an input signal bandwidth at a bandwidth less than the input signal bandwidth and operative to generate a parameter estimate signal; and
   a signal metric comparison device responsive to the signal parameter estimate signal and operative to generate a dynamic multi-path indication signal for detecting dynamic multi-path wherein the signal metric comparison device includes,
      a summing device for summing the parameter estimate signals and operative to generate a metric difference signal;
      an absolute value device responsive to said metric difference signal and operative to generate an absolute metric difference signal;
      a first threshold comparison device and a second threshold comparison device, both coupled to receive the absolute metric difference signal, the first threshold comparison device operative to generate a first threshold comparison signal and the second threshold comparison device operative to generate a second threshold comparison signal, and the signal metric comparison device further includes a counter responsive to the first threshold comparison signal and operative to generate a threshold comparison time signal, a third threshold comparison device coupled to receive the threshold comparison time signal and operative to generate a third threshold comparison signal.

7. A dynamic multi-path detection device, as recited in claim 6, wherein said dynamic multi-path indication signal is used to adapt multi-path tracking speed in accordance with multi-path changes thereby causing mitigation of dynamic multi-path and increasing system performance.

8. A dynamic multi-path detection device, as recited in claim 6 wherein the signal metric comparison device further includes a logic device responsive to the second threshold comparison signal and the third threshold comparison signal and operative to generate the dynamic multi-path indication signal.

9. A dynamic multi-path detection device, as recited in claim 6 wherein the dynamic multi-path detection device is responsive to changes in said signal metric estimates over time.

10. A dynamic multi-path detection device, as recited in claim 6 wherein the input signal is the output of a carrier recovery circuit.

11. A dynamic multi-path detection device comprising:
- at least one narrow-band signal metric estimator responsive to an input signal with an input signal bandwidth, each of the at least one estimators measuring a particular characteristic of the input signal within a bandwidth less than the input signal bandwidth and operative to generate a parameter estimate signal; and
- a signal metric comparison device responsive to the parameter estimate signal(s) and operative to generate a dynamic multi-path indication signal for detecting dynamic multi-path, wherein the signal metric comparison device includes:
  - a first threshold comparison device and a second threshold comparison device, both threshold comparison devices coupled to receive an absolute metric difference signal and configured to generate a first and second threshold signal, and wherein the signal metric comparison device further includes a counter responsive to the at least one of the threshold comparison signals and operative to generate a threshold comparison time signal; and
  - a third threshold comparison device coupled to receive the threshold comparison time signal and operative to generate a third threshold comparison signal.

* * * * *